United States Patent
Huang et al.

(10) Patent No.: US 12,306,693 B2
(45) Date of Patent: May 20, 2025

(54) METHOD AND DEVICE FOR SAVING POWER

(71) Applicant: MEDIATEK INC., Hsinchu (TW)

(72) Inventors: Ching-Yao Huang, Hsinchu (TW); Bo-Yun Lin, Hsinchu (TW); Tai-Ying Jiang, Hsinchu (TW); Hui-Hsuan Wang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 88 days.

(21) Appl. No.: 18/316,344

(22) Filed: May 12, 2023

(65) Prior Publication Data

US 2024/0377876 A1 Nov. 14, 2024

(51) Int. Cl.
*G06F 1/32* (2019.01)
*G06F 1/3234* (2019.01)
*G06F 1/3237* (2019.01)
*G06F 1/3287* (2019.01)

(52) U.S. Cl.
CPC .......... *G06F 1/3253* (2013.01); *G06F 1/3237* (2013.01); *G06F 1/3287* (2013.01)

(58) Field of Classification Search
CPC ..... G06F 1/3253; G06F 1/3237; G06F 1/3287
See application file for complete search history.

(56) References Cited

U.S. PATENT DOCUMENTS

| | | | |
|---|---|---|---|
| 10,928,882 B2 | 2/2021 | Chen | |
| 11,334,512 B1 | 5/2022 | Tripathy | |
| 11,520,729 B2 | 12/2022 | Mishra | |
| 11,625,064 B2 | 4/2023 | Narala | |
| 2004/0128565 A1* | 7/2004 | Horigan | G06F 1/26 713/300 |
| 2015/0168991 A1 | 6/2015 | Sengoku | |
| 2019/0155781 A1 | 5/2019 | Amarilio | |
| 2023/0176995 A1 | 6/2023 | Guan | |
| 2024/0089195 A1* | 3/2024 | Mishra | G06F 13/4291 |

FOREIGN PATENT DOCUMENTS

| | | |
|---|---|---|
| CN | 115396255 A | 11/2022 |
| CN | 115981450 A | 4/2023 |
| EP | 1337908 B1 | 6/2010 |
| TW | 202215202 A | 4/2022 |
| TW | 202232335 A | 8/2022 |
| TW | 202244744 A | 11/2022 |
| TW | 202311977 A | 3/2023 |

OTHER PUBLICATIONS

Extended European Search Report dated Jun. 25, 2024, issued in application No. EP 24150074.3.
Chinese language Notice of Allowance dated Sep. 30, 2024, issued in application No. TW 113101374.

* cited by examiner

*Primary Examiner* — Zahid Choudhury
(74) *Attorney, Agent, or Firm* — McClure, Qualey & Rodack, LLP (57) ABSTRACT

A method for saving power is provided. The method is used in a slave device. The method includes receiving a first system power management interface (SPMI) write command from an external device via a SPMI bus when the slave device is in sleep mode. The method includes turning on a system clock in response to the first SPMI write command indicating to turn on the system clock. The method includes allowing the external device to access the slave device.

20 Claims, 6 Drawing Sheets

METHOD AND DEVICE FOR SAVING POWER

BACKGROUND OF THE INVENTION

Field of the Invention

The present disclosure generally relates to a method and a device for saving power. More specifically, aspects of the present disclosure relate to a method and a device for saving power in a System Power Management Interface (SPMI) slave device.

Description of the Related Art

Computing devices abound in modern society. The proliferation of computing devices is at least in part attributable to the rise of mobile computing devices such as smartphones. Computing devices frequently rely on different specialized integrated circuits (ICs) that perform specific functions for the computing devices. When more than one IC is present, there must be an accepted protocol or standard through which the ICs may communicate with one another. Much as the ICs may be specialized in the tasks that they are capable of performing, so too have specialized protocols been created. One such protocol is the system power management interface (SPMI) put forth by the MIPI Alliance.

In the SPMI protocol, a simple SPMI slave device may work only when a master device provides a SPMI clock (SCLK) signal. When the SPMI slave device has only one single clock domain such as a system clock, the SPMI slave device cannot perform any functions once SPMI access is stopped and the system clock in the SPMI slave device is turned off.

In order to saving power on a System on a Chip (SOC) of the SPMI slave device, the high-speed system clock will adaptively be turned off while the SPMI slave device is idle. However, function related registers, which using the system clock in the SPMI slave device, are updated only when the system clock is active. Once the system clock is turned off, these registers may not be updated via the SPMI access, and other devices on the SPMI bus cannot communicate with the SPMI slave device when the system clock is off.

Therefore, there is a need for a method and a device for saving power to solve this problem.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and a device for saving power to enable the system clock to be turned off adaptively when the device is idle, and enable the external devices to still communicate with the device during the period when the system clock is turned off.

In an exemplary embodiment, a method for saving power in a slave device is provided. The method is used in a slave device. The method comprises receiving a first system power management interface (SPMI) write command from an external device via a SPMI bus when the slave device is in sleep mode. The method comprises turning on a system clock in response to the first SPMI write command indicating to turn on the system clock. The method comprises allowing the external device to access the slave device.

In some embodiments, the method further comprises transmitting a SPMI acknowledge (ACK) command to the external device to inform the external device that the system clock has been turned on.

In some embodiments, the method further comprises comparing receiving a second SPMI write command from the external device via the SPMI bus. The method further comprises turning off the system clock in response to the second SPMI write command indicating to turn off the system clock.

In some embodiments, the first SPMI write command comprises a predefined index, the predefined index is 0 indicating to turn on the system clock, and the predefined index is 1 indicating to turn off the system clock.

In some embodiments, the second SPMI write command comprises a predefined index, the predefined index is 0 indicating to turn on the system clock, and the predefined index is 1 indicating to turn off the system clock.

In some embodiments, the slave device is clocked by a SPMI clock (SCLK) when the slave device is in the sleep mode.

In some embodiments, the slave device is a SPMI slave device, and the external device is a SPMI master device.

In some embodiments, the first SPMI write command is an extended register write long command, an extended register write command, a register write command or a register 0 write command.

In some embodiments, the second SPMI write command is an extended register write long command, an extended register write command, a register write command or a register 0 write command.

In some embodiments, the SPMI ACK command is an extended register write long command, an extended register write command, a register write command, a register 0 write command or a master write command.

In an exemplary embodiment, a device for saving power is provided. The device comprises a system clock circuit, a control circuit and a processor. The control circuit is coupled to the system clock circuit and configured to receive a first system power management interface (SPMI) write command from an external device via a SPMI bus when the device is in sleep mode. The control circuit is further configured to turn on the system clock circuit in response to the first SPMI write command indicating to turn on the system clock circuit. The processor is coupled to the system clock circuit and the processor is configured to allow the external device to access the device.

BRIEF DESCRIPTION OF THE DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION OF THE INVENTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

In order to better describe the embodiments of the present disclosure, the specific terms used in the present disclosure are firstly defined as below.

Master device: A device on the SPMI bus that can drive the SPMI clock (SCLK) line.

Slave device: A device on the SPMI bus that is not capable of driving the SCLK line, i.e. not a Master device.

The System Power Management Interface (SPMI) is a two-wire serial interface that connects the integrated Power Controller (PC) of a System-on-Chip (SoC) processor system with one or more Power Management Integrated Circuits (PMIC) voltage regulation systems. SPMI enables systems to dynamically adjust the supply and substrate bias voltages of the voltage domains inside the SoC using a single SPMI bus.

Within the PC, the SPMI-related functions are referred to as the "Master" device. Within a PMIC, the SPMI related functions are referred to as the "Slave" device. There may be up to four master devices and up to sixteen slave devices on a single SPMI bus. Multiple SPMI master devices and slave devices may reside on a single IC, on several separate ICs or any combination of the two.

Figure 1:
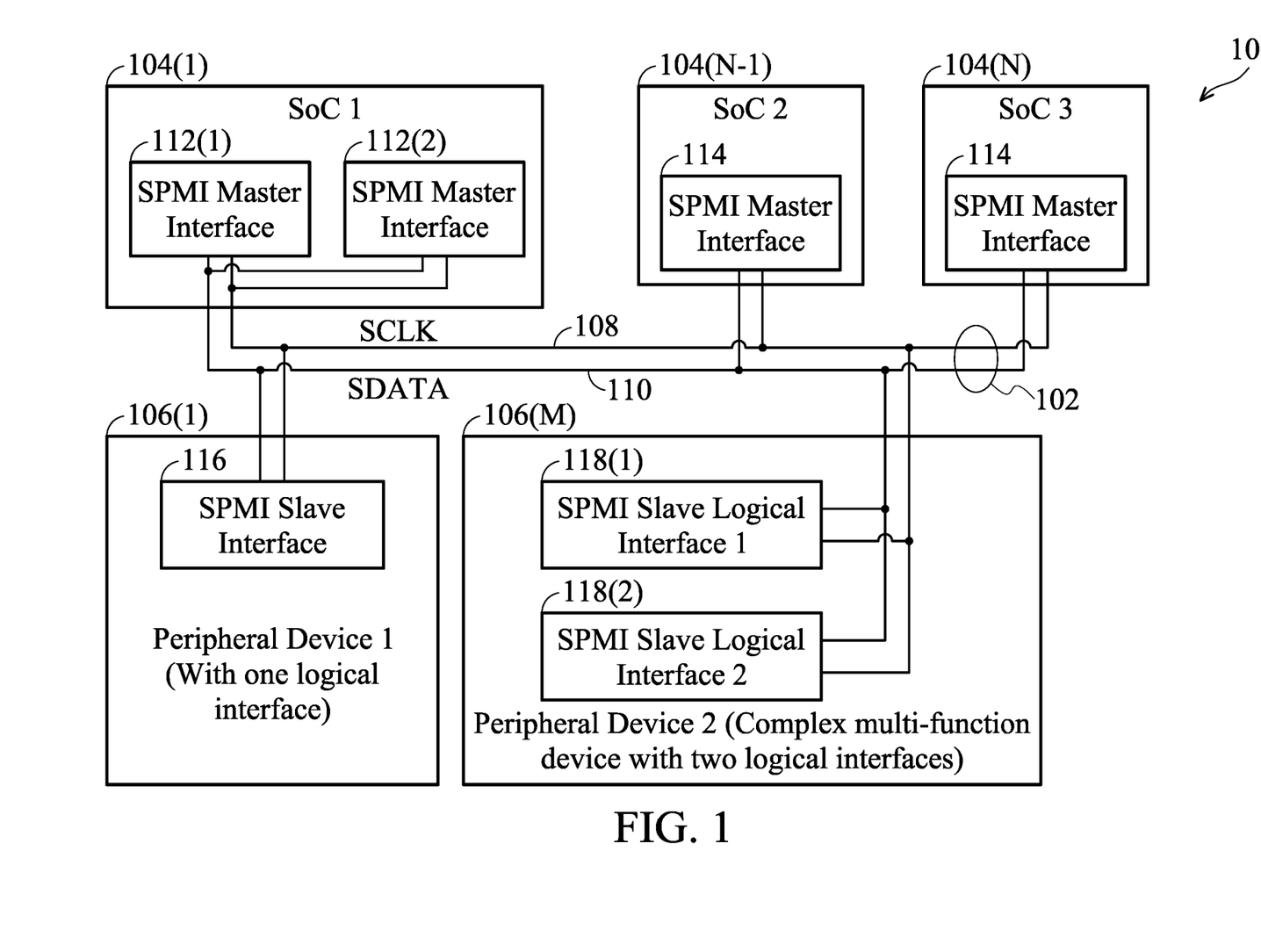
FIG. 1 is a block diagram of an SPMI system having multiple master devices and multiple slave devices attached to a two-wire SPMI bus.

FIG. 1 is a block diagram of an SPMI system 100 having multiple master devices and multiple slave devices attached to a two-wire SPMI bus 102. In this regard, the SPMI system 100 includes a plurality of master devices 104(1)-104(N) and a plurality of slave devices 106(1)-106(M). As illustrated, N=3 and M=2, but it should be appreciated that the SPM standard allows up to four master devices 104 and up to sixteen slave devices 106. The SPMI bus 102 may include a clock line 108 and a data line 110 (also referred as SCLK and SDATA, respectively, in FIG. 1). A given master device 104(1) may have multiple (in this case two) SPMI interfaces 112(1)-112(2) coupled to the SPMI bus 102. More commonly, a master device such as master device 104(N) may have a single SPMI interface 114 coupled to the SPMI bus 102. Similarly, a slave device such as slave device 106(1) may have a single SPMI interface 116 and a slave device such as slave 106(M) may have multiple (in this case two) SPMI interfaces 118(1)-118(2).

Figure 2:
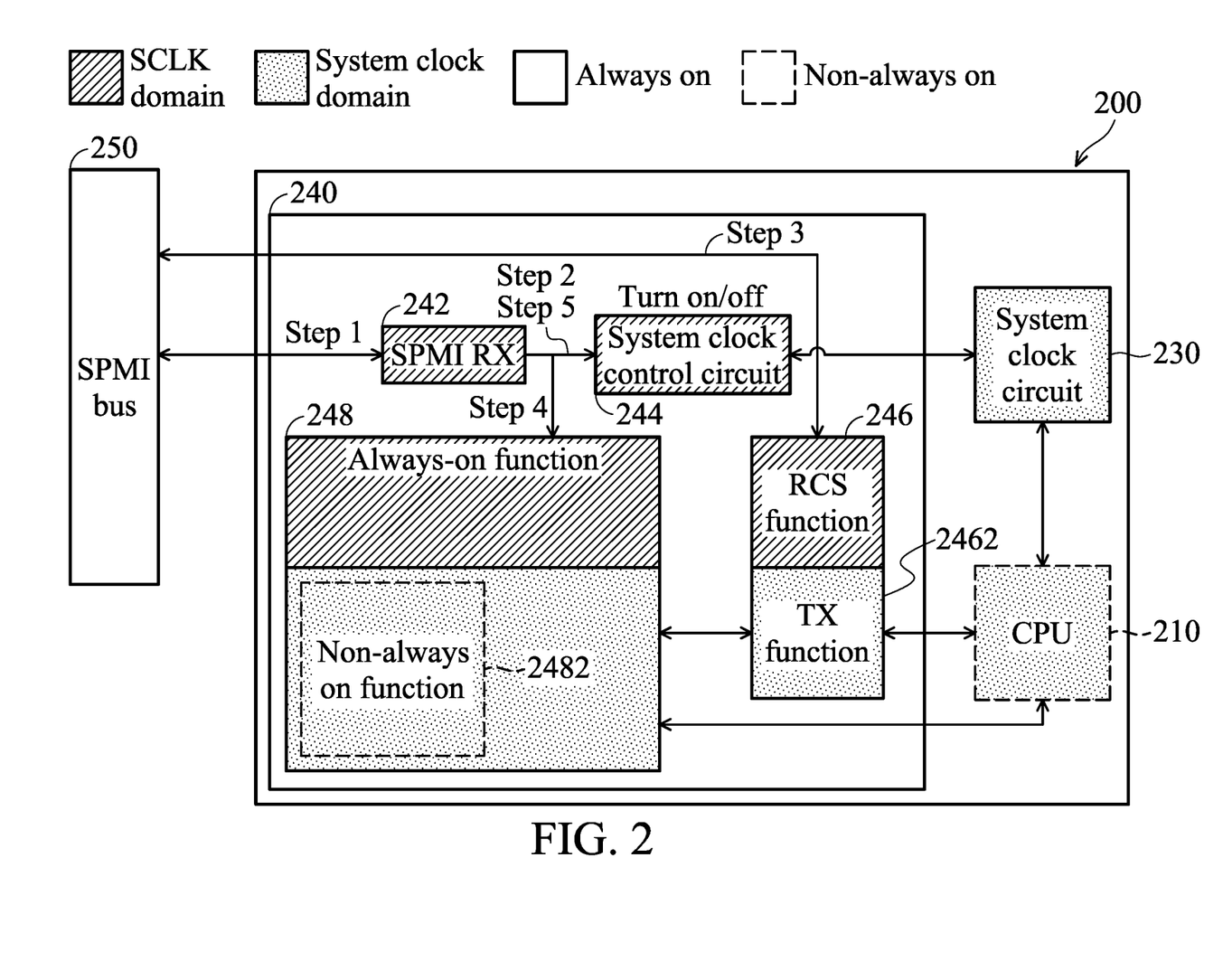
FIG. 2 is a schematic diagram illustrating an example slave device for saving power according to an embodiment of the disclosure.

FIG. 2 is a schematic diagram illustrating an example slave device 200 for saving power according to an embodiment of the disclosure. The slave device 200 may include a central processing unit (CPU) 210 and a SPMI slave subsystem 240. The SPMI slave subsystem 240 includes a SPMI receiver 242 (sometimes referred to as SPMI RX in the drawings), a system clock control circuit 244, a Request Capable Slave (RCS) function 246 and a transmission (TX) function 2462 and an always-on function 248, wherein the always-on function 248 may include a non-always on function 2482.

In FIG. 2, the CPU 210 is coupled to the system clock circuit 230, the TX function 2462 and the always-on function 248, the always-on function 248 is coupled to the SPMI receiver 242, the TX function 2462 and the CPU 210, and the system clock control circuit 244 is coupled to the SPMI receiver 242, the RCS function 246 and the system clock circuit 230.

In the slave device 200, the SPMI receiver 242, the system clock control circuit 244, the RCS function 246 and the always-on function 248 belong to the SCLK domain, while the CPU 210, the system clock circuit 230, the TX function 2462 and the non-always on function 2482 belong to the system clock domain. Specifically, the SPMI receiver 242, the system clock control circuit 244, the RCS function 246 and the always-on function 248 operates when the SCLK runs or the system clock circuit 230 is turned on, and the SCLK only runs while data is being transferred on the SPMI bus 250. The CPU 210, the TX function 2462 and the non-always on function 2482 operates when the system clock circuit 230 is turned on.

It should be noted that although the SPMI receiver 242, the system clock control circuit 244, the RCS function 246 and the always-on function 248 are drawn as belonging to the SCLK domain in FIG. 2, those skilled in the art can understand that the SPMI receiver 242, the system clock control circuit 244, the RCS function 246 and the always-on function 248 can also operate when the system clock circuit 230 is active.

An external device (not shown in FIG. 2) may transmit a first SPMI write command to the SPMI receiver 242 via the SPMI bus 250 when the slave device 200 is in sleep mode (Step 1), wherein the external device is a SPMI master device. It should be noted that the slave device 200 in the sleep mode means that the system clock circuit 230 is turned off and the slave device is clocked by the SPMI clock (SCLK). Since the SPMI receiver 242, the system clock control circuit 244, the RCS function 246 and the always-on function 248 belong to the SCLK domain, the SPMI receiver 242, the system clock control circuit 244, the RCS function 246 and the always-on function 248 still run when the system clock circuit 230 is turned off.

Then, the SPMI receiver 242 transmits the first SPMI write command to the system clock control circuit 244. The system clock control circuit 244 detects the first SPMI write command. In response to the first SPMI write command indicating to turn on the system clock circuit 230, the system clock control circuit 244 transmits a signal to turn on the system clock circuit 230 (Step 2).

Next, the CPU 210 transmits a SPMI acknowledge (ACK) command to the external device via the RCS function 246, the TX function 2462 and the SPMI bus 250 to inform the external device that the system clock circuit 230 has been turned on (Step 3). Specifically, the TX function 2462 is triggered by the CPU 210 to convert the SPMI ACK command into a command conforming to the SPMI protocol, and then the RCS function 246 transmits the SPMI ACK command to the external device via the SPMI bus 250.

The CPU 210 may allow the external device to access to the slave device 200 (Step 4), such as registers with the non-always on function 2482 in the SPMI slave subsystem 240.

Once the external device do not need to use the system clock circuit 230, then the external device may transmit a second SPMI write command to the slave device 200. The SPMI receiver 242 receives the second SPMI write command via the SPMI bus 250, and transmits the second SPMI write command to the system clock control circuit 244. The system clock control circuit 244 detects the second SPMI write command. In response to the SPMI write command indicating to turn off the system clock circuit 230, the system clock control circuit 244 transmits a signal to turn off the system clock circuit 230 (Step 5).

In another embodiment, since more than one external slave/master device communicates with the slave device 200 through the SPMI bus 250, the SPMI receiver 242 may receive multiple first SPMI write commands indicating to turn on the system clock (that is, the SPMI receiver 242 may receive multiple first SPMI write commands within a period of time). Therefore, a voting mechanism is provided by the system clock control circuit 244, wherein the voting mechanism may be performed through software, firmware or hardware instructions implemented on a computer implemented through software. The first SPMI write command transmitted by each external slave/master device is regarded as a behavior similar to raising a hand. In other words, the system clock control circuit 244 may not turn off the system clock circuit 230 as long as there is an external slave/master device that has transmitted the first SPMI write command and has not transmitted the second SPMI write command.

As an example, it is assumed that Slave device 1 transmits a first SPMI write command to request to turn on the system clock. The CPU 210 transmits a SPMI ACK command to Slave device 1 after receiving the first SPMI write command. Then, Slave device 2 also transmits a first SPMI write command to request to turn on the system clock. The CPU 210 transmits a SPMI ACK command to Slave device 2 after receiving the first SPMI write command. When Slave device 1 transmits a second SPMI write command to request to turn off the system clock, the system clock control circuit 244 determines whether there are other external devices that have transmitted the first SPMI write command but have not transmitted the second SPMI write command (i.e., raise hands) according to the voting mechanism. When the system clock control circuit 244 determines that Slave device 2 has not transmitted the second SPMI write command, the system clock will still be turned on. The system clock control circuit 244 does not close the system clock until Slave device 2 transmits the second SPMI write command.

Figure 3:
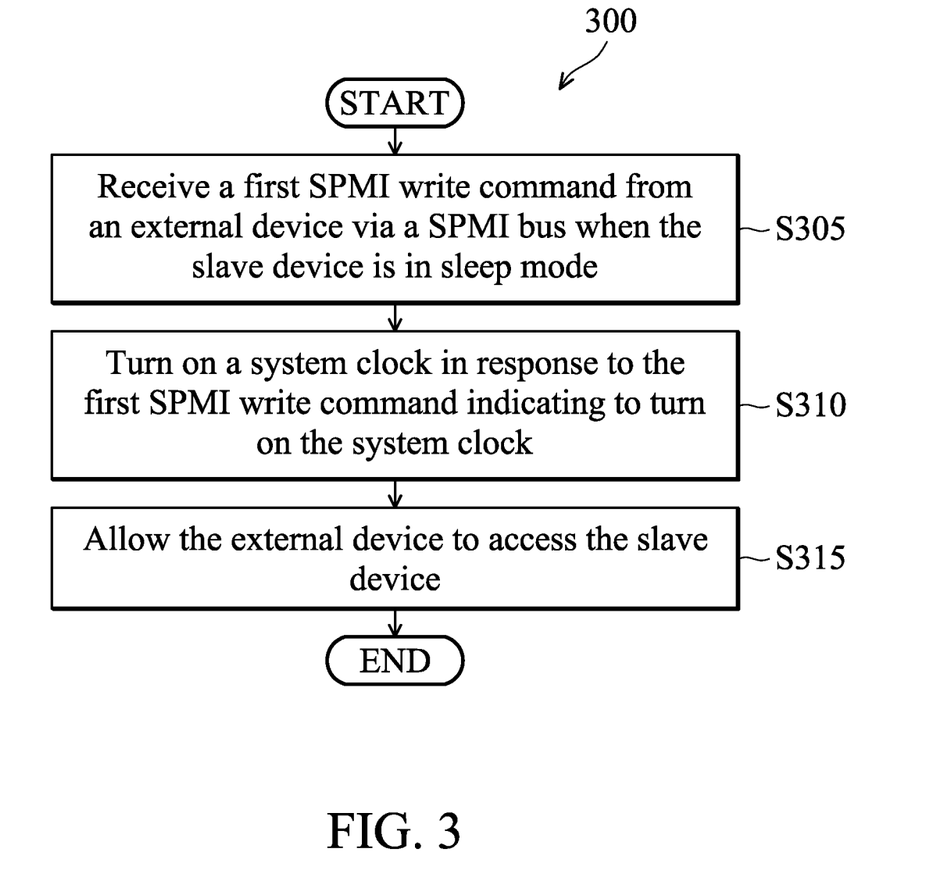
FIG. 3 is a flow chart illustrating the method for saving power in a slave device according to an embodiment of the disclosure.

FIG. 3 is a flow chart 300 illustrating the method for saving power in a slave device according to an embodiment of the disclosure. In this embodiment, the method is applied to the slave device 200 in FIG. 2.

In step S305, the SPMI receiver of the slave device receives a first SPMI write command from an external device via a SPMI bus when the slave device is in sleep mode, wherein the slave device is a SPMI slave device and the external device is a SPMI master device.

Then, the system clock control circuit of the slave device detects the first SPMI write command from the SPMI receiver. In step S310, the system clock control circuit turns on a system clock in response to the first SPMI write command indicating to turn on the system clock. In one embodiment, the first SPMI write command comprises a predefined index, wherein the predefined index is 0 indicating to turn on the system clock, and the predefined index is 1 indicating to turn off the system clock. The system clock control circuit may turns on/off the system clock according to the predefined index. Furthermore, the first SPMI write command is an extended register write long command, an extended register write command, a register write command or a register 0 write command, and the predefined index is sent in the data frame in the extended register write command, the register write command or the register 0 write command.

In another embodiment, the predefined index may be changed at any time through software. The system clock control circuit may use the current setting of the software as the criterion for determining whether to change the predefined index.

In step S315, the CPU of the slave device allows the external device to access the slave device.

In some embodiments, after step S310, the CPU of the slave device may further transmit a SPMI acknowledge (ACK) command to the external device via the SPMI bus to inform the external device that the system clock has been turned on, wherein the SPMI ACK command is an extended register write long command, an extended register write command, a register write command, a register 0 write command or a master write command.

In some embodiments, the SPMI receiver may further receives a second SPMI write command from the external device via the SPMI bus after step S320. The system clock control circuit detects the second SPMI write command from the SPMI receiver, wherein the second SPMI write command comprises a predefined index, the predefined index is 0 indicating to turn on the system clock, and the predefined index is 1 indicating to turn off the system clock. The system clock control circuit turns off the system clock in response to the second SPMI write command indicating to turn off the system clock. Furthermore, the second SPMI write command is an extended register write long command, an extended register write command, a register write command or a register 0 write command, and the predefined index is sent in the data frame in the extended register write command, the register write command or the register 0 write command.

In another embodiment, after the external device transmits the first SPMI write command, the external device may count a predetermined period of time, wherein the predetermined period of time may be a settle time required for the system clock to be turned on. When the predetermined period of time expires, the external device may directly access the slave device.

Figure 4A:
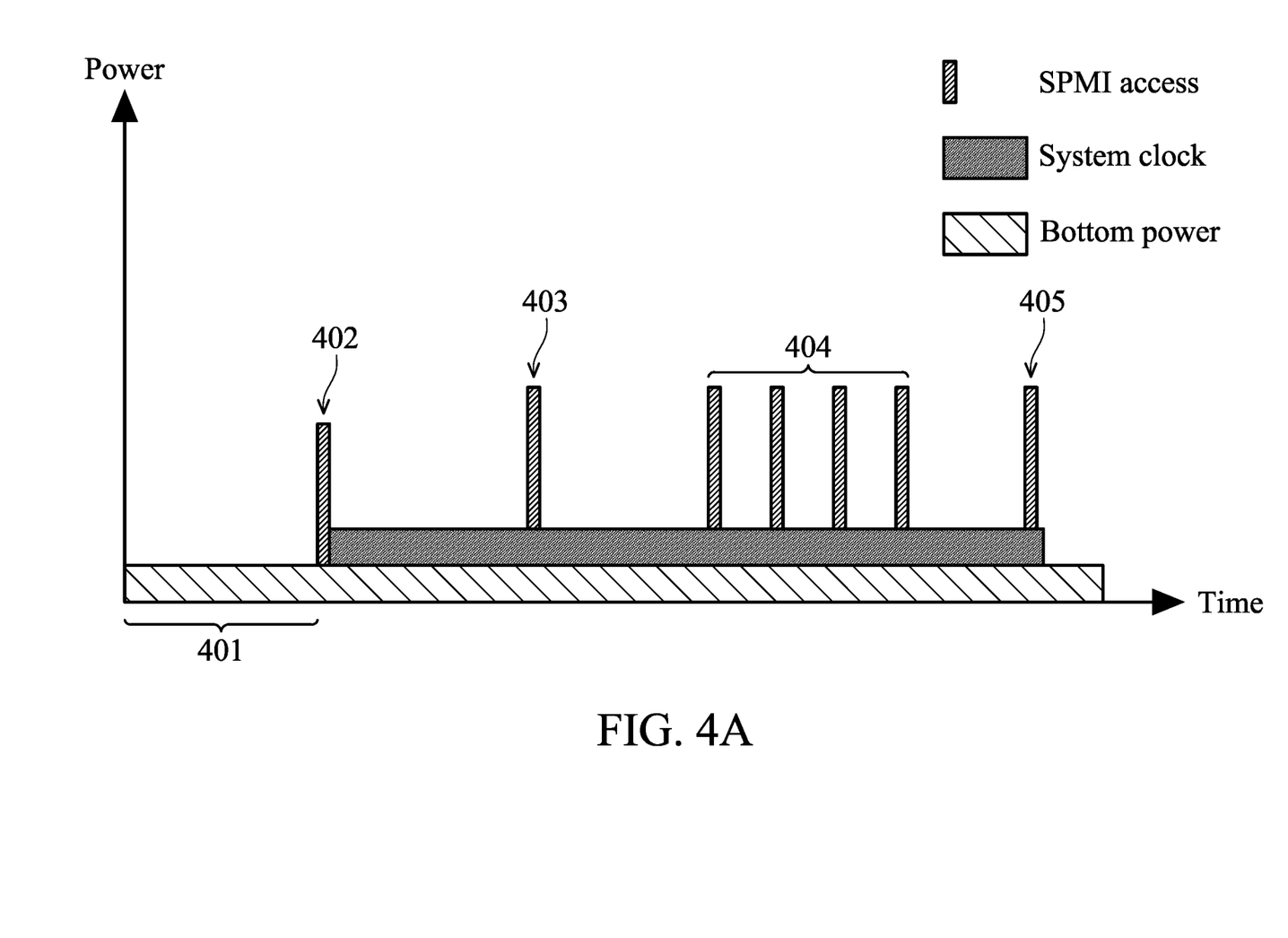
FIGS. 4A-4B are timing diagrams illustrating operation of saving power in a slave device according to an embodiment of the disclosure.
Figure 4B:
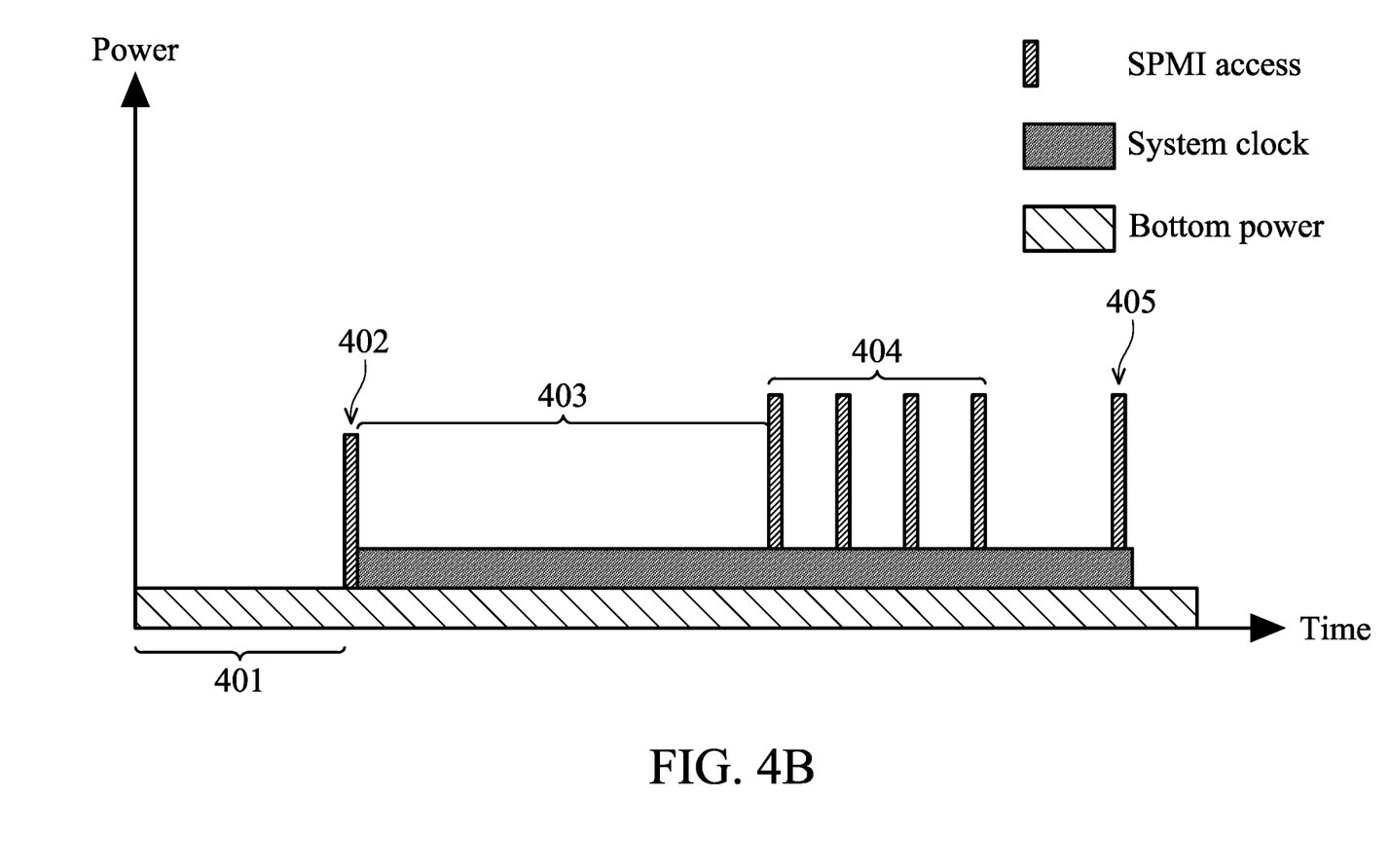

FIGS. 4A-4B are timing diagrams 400 illustrating operation of saving power in a slave device according to an embodiment of the disclosure. Time increases from left to right in FIGS. 4A-4B, in arbitrary units. The bottom power represents the minimum power required by the slave device in the sleep mode.

FIG. 4A describes the situation that the slave device transmits the SPMI ACK command to the external device to inform the external device that the system clock has been turned on after receiving the first SPMI write command.

In time interval 401, since the slave device is initially in the sleep state, the slave device only uses the bottom power. At 402, the slave device receives a first SPMI write command indicating to turn on the system clock from the external device. At 403, the slave device transmits a SPMI ACK command to the external device to inform the external device that the system clock has been turned on. In time interval 404, the external device performs the SPMI accesses with the slave device when the system clock runs. At 405, the slave device receives a second SPMI write command indicating to turn off the system clock from the external device.

FIG. 4B describes the situation of accessing the slave device when a predetermined period of time counted by the external device expires. Different from FIG. 4A, the slave device in FIG. 4B does not need to transmit the SPMI ACK command to the external device.

In time interval 401, since the slave device is initially in the sleep state, the slave device only uses the bottom power. At 402, the slave device receives a first SPMI write command indicating to turn on the system clock from the external device. At time interval 403, the external device counts a predetermined period of time. In time interval 404, the external device performs the SPMI accesses with the slave device after the predetermined period of time expires. At 405, the slave device receives a second SPMI write command indicating to turn off the system clock from the external device.

As mentioned above, the method and device for saving power in the disclosure may adaptively turn off the system clock when the slave device is idle. In other words, only the SPMI-related functions work normally, rather than the whole slave device, which can more effectively achieve the purpose of saving power. In addition, the manner of triggering to turn on the system clock in the slave device by other external devices may increase the flexibility in use.

It should be noted that the CPU 210, the system clock circuit 230, the SPMI receiver 242, the system clock control circuit 244, the RCS function 246, the TX function 2462 and the always-on function 248 in FIG. 2 may be implemented in hardware, software, firmware, or any combination thereof. For example, the CPU 210, the system clock circuit 230, the SPMI receiver 242, the system clock control circuit 244, the RCS function 246, the TX function 2462 and the always-on function 248 may be implemented as computer program code configured to be executed in one or more processors. Alternatively, the CPU 210, the system clock circuit 230, the SPMI receiver 242, the system clock control circuit 244, the RCS function 246, the TX function 2462 and the always-on function 248 may be implemented as hardware logic/electrical circuitry.

Figure 5:
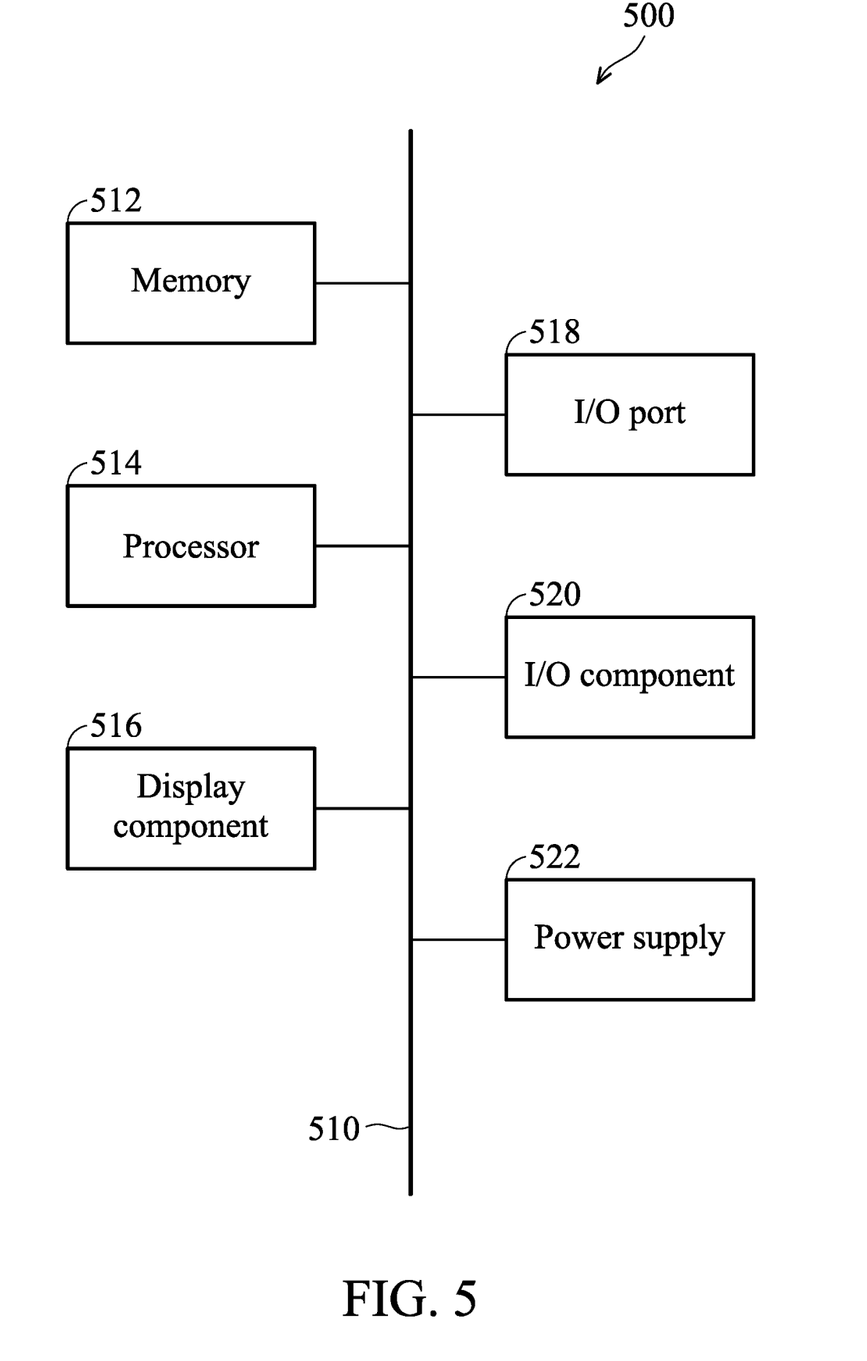
FIG. 5 illustrates an exemplary operating environment for implementing embodiments of the present disclosure.

The embodiments described herein, including systems, methods/processes, and/or apparatuses, may be implemented using well known servers/computers, such as an electronic device 500 shown in FIG. 5. For example, the slave device 200 can be implemented using one or more electronic device 500. The electronic device 500 is described as follows, for purposes of illustration.

Referring to FIG. 5, an exemplary operating environment for implementing embodiments of the present disclosure is shown and generally known as an electronic device 500. The electronic device 500 is merely an example of a suitable computing environment and is not intended to limit the scope of use or functionality of the disclosure. Neither should the electronic device 500 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 5, the electronic device 500 may include a bus 510 that is directly or indirectly coupled to the following devices: one or more memories 512, one or more processors 514, one or more display components 516, one or more input/output (I/O) ports 518, one or more input/output components 520, and an illustrative power supply 522. The bus 510 may represent one or more kinds of busses (such as an address bus, data bus, or any combination thereof). Although the various blocks of FIG. 5 are shown with lines for the sake of clarity, and in reality, the boundaries of the various components are not specific. For example, the display component such as a display device may be considered an I/O component and the processor may include a memory.

The electronic device 500 typically includes a variety of computer-readable media. The computer-readable media can be any available media that can be accessed by electronic device 500 and includes both volatile and nonvolatile media, removable and non-removable media. By way of example, not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the electronic device 500. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 512 may include computer-storage media in the form of volatile and/or nonvolatile memory. The memory may be removable, non-removable, or a combination thereof. Exemplary hardware devices include solid-state memory, hard drives, optical-disc drives, etc. The electronic device 500 includes one or more processors that read data from various entities such as the memory 512 or the I/O components 520. The display component(s) 516 present data indications to a user or to another device. Exemplary presentation components include a display device, speaker, printing component, vibrating component, etc.

The I/O ports 518 allow the computing device 500 to be logically coupled to other devices including the I/O components 520, some of which may be embedded. Illustrative components include a microphone, joystick, game pad, satellite dish, scanner, printer, wireless device, etc. The I/O components 520 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the electronic device 500, or any combination thereof. The electronic device 500 may be equipped with depth cameras, such as stereoscopic camera systems, infrared camera systems, RGB camera systems, or any combination thereof, to realize gesture detection and recognition. Furthermore, the electronic device 500 may be equipped with accelerometers or gyroscopes that enable detection of motion. The output of the accelerometers or gyroscopes may be provided to the display of the electronic device 500 to carry out immersive augmented reality or virtual reality.

Furthermore, the processor 514 in the electronic device 500 can execute the program code in the memory 512 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for saving power, used in a slave device, comprising:
   receiving a first system power management interface (SPMI) write command from an external device via a SPMI bus when the slave device is in sleep mode;
   turning on a system clock of the slave device in response to the first SPMI write command indicating to turn on the system clock; and
   allowing the external device to access the slave device.

2. The method as claimed in claim 1, further comprising:
   transmitting a SPMI acknowledge (ACK) command to the external device to inform the external device that the system clock has been turned on.

3. The method as claimed in claim 1, further comprising:
   receiving a second SPMI write command from the external device via the SPMI bus; and
   turning off the system clock in response to the second SPMI write command indicating to turn off the system clock.

4. The method as claimed in claim 1, wherein the first SPMI write command comprises a predefined index, the predefined index is 0 indicating to turn on the system clock, and the predefined index is 1 indicating to turn off the system clock.

5. The method as claimed in claim 3, wherein the second SPMI write command comprises a predefined index, the predefined index is 0 indicating to turn on the system clock, and the predefined index is 1 indicating to turn off the system clock.

6. The method as claimed in claim 1, wherein the slave device is clocked by a SPMI clock (SCLK) when the slave device is in the sleep mode.

7. The method as claimed in claim 1, wherein the slave device is a SPMI slave device, and the external device is a SPMI master device.

8. The method as claimed in claim 1, wherein the first SPMI write command is an extended register write long command, an extended register write command, a register write command or a register 0 write command.

9. The method as claimed in claim 3, wherein the second SPMI write command is an extended register write long command, an extended register write command, a register write command or a register 0 write command.

10. The method as claimed in claim 1, wherein the SPMI ACK command is an extended register write long command, an extended register write command, a register write command, a register 0 write command or a master write command.

11. A device for saving power, comprising:
a system clock circuit;
a control circuit coupled to the system clock circuit, wherein the control circuit is configured to:
receive a first system power management interface (SPMI) write command from an external device via a SPMI bus when the device is in sleep mode;
turn on the system clock circuit in response to the first SPMI write command indicating to turn on the system clock circuit; and
a processor coupled to the system clock circuit, wherein the processor is configured to:
allow the external device to access the device.

12. The device as claimed in claim 11, wherein the processor is further configured to:
transmit a SPMI acknowledge (ACK) command to the external device to inform the external device that the system clock circuit has been turned on.

13. The device as claimed in claim 11, wherein the control circuit is further configured to:
receive a second SPMI write command from the external device via the SPMI bus; and
turn off the system clock circuit in response to the second SPMI write command indicating to turn off the system clock circuit.

14. The device as claimed in claim 11, wherein the first SPMI write command comprises a predefined index, the predefined index is 0 indicating to turn on the system clock circuit, and the predefined index is 1 indicating to turn off the system clock circuit.

15. The device as claimed in claim 13, wherein the second SPMI write command comprises a predefined index, the predefined index is 0 indicating to turn on the system clock circuit, and the predefined index is 1 indicating to turn off the system clock circuit.

16. The device as claimed in claim 11, wherein the device is clocked by a SPMI clock (SCLK) when the device is in the sleep mode.

17. The device as claimed in claim 11, wherein the device is a SPMI slave device, and the external device is a SPMI master device.

18. The device as claimed in claim 11, wherein the first SPMI write command is an extended register write long command, an extended register write command, a register write command or a register 0 write command.

19. The device as claimed in claim 13, wherein the second SPMI write command is an extended register write long command, an extended register write command, a register write command or a register 0 write command.

20. The device as claimed in claim 11, wherein the SPMI ACK command is an extended register write long command, an extended register write command, a register write command, a register 0 write command or a master write command.

* * * * *